Jan. 8, 1929.  1,698,291

A. E. ANDERSON

CONTROL SYSTEM

Original Filed July 31, 1924

Inventor:
Arvid E. Anderson;
by
His Attorney.

Patented Jan. 8, 1929.

1,698,291

UNITED STATES PATENT OFFICE.

ARVID E. ANDERSON, OF SCOTIA, NEW YORK, ASSIGNOR TO GENERAL ELECTRIC COMPANY, A CORPORATION OF NEW YORK.

CONTROL SYSTEM.

Application filed July 31, 1924, Serial No. 729,416. Renewed September 28, 1928.

My invention relates to control systems for electroresponsive devices such as circuit breakers and particularly to such systems in which the coils of a plurality of electroresponsive devices are arranged to be supplied from a common source such as a battery.

In the copending application, Serial No. 628,884 filed March 30, 1923, by Elmer F. Bliss, and assigned to the same assignee as the application, there is disclosed and claimed a control system whereby only one of a plurality of electroresponsive devices can be supplied from a common source at any instant, and one object of my invention is to provide an improved system of control of the type disclosed in the above mentioned copending application.

My invention will be better understood from the following description, taken in connection with the accompanying drawing, and its scope will be pointed out in the appended claims.

Figure 1:
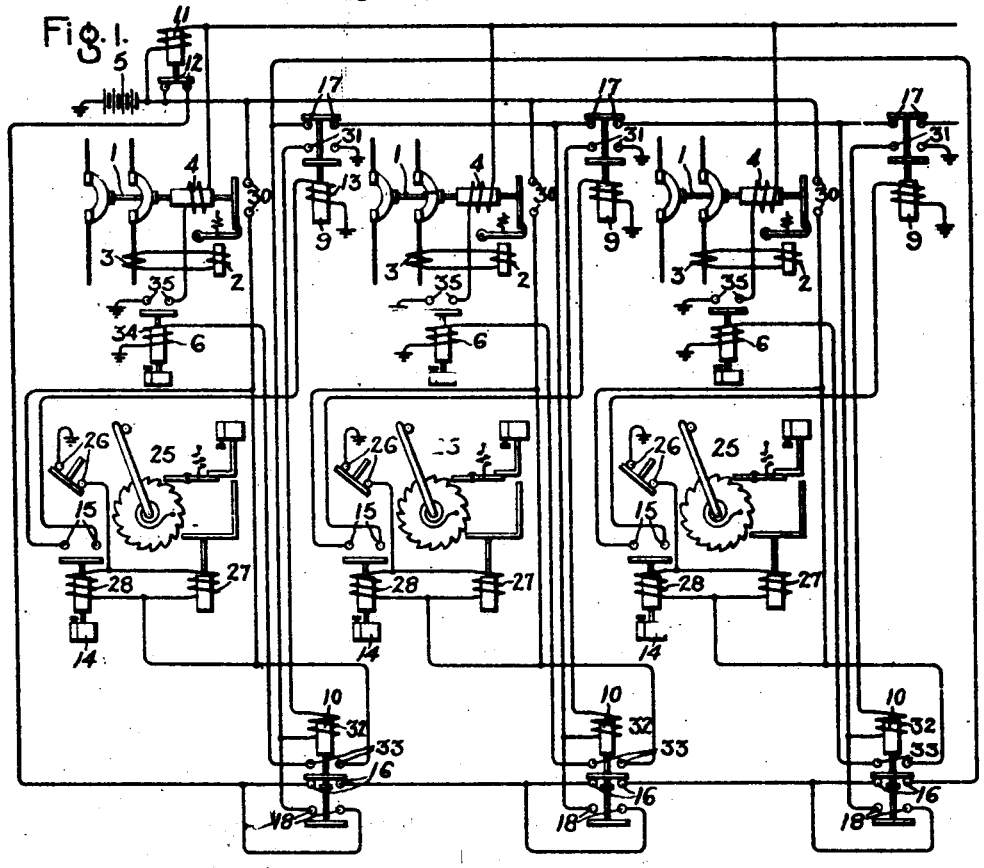
Figure 2:
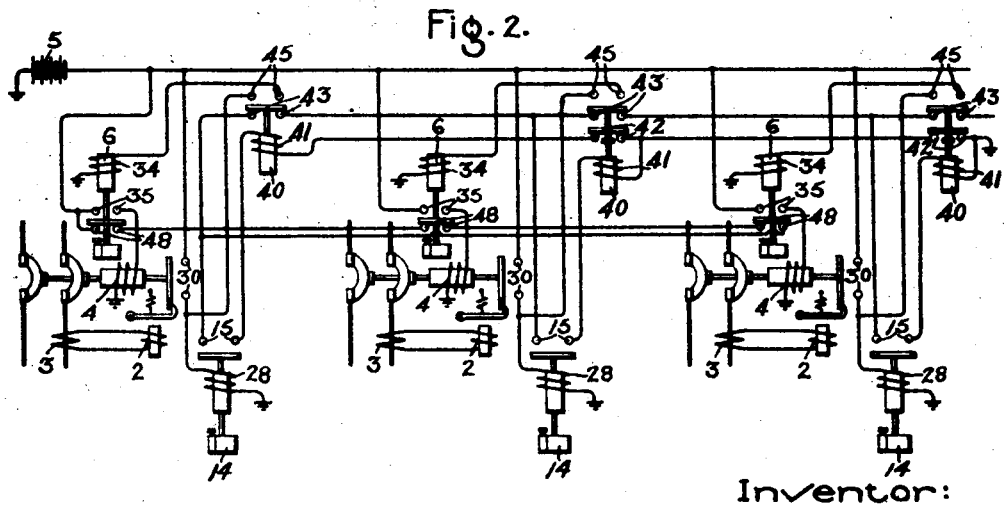

In the drawing, Fig. 1 shows an automatic reclosing circuit breaker system embodying my invention, and Fig. 2 shows a modification thereof.

Referring to Fig. 1, a plurality of circuit breakers 1, which may be of any suitable type, are shown, each being arranged to control a different circuit. As shown, the circuit breakers are of the well-known latched-in type. Each breaker is provided with a trip coil 2, which is energized by a current transformer 3 connected in the circuit controlled by the respective circuit breaker, and with a closing coil 4, which, when energized, closes the respective circuit breaker. Each closing coil 4 is arranged to be supplied with current from a suitable source of current, shown as a battery 5, which is common to all of the closing coils.

It is evident that if no means are provided for limiting the number of closing coils 4 that can be connected to the battery 5 at any instant, it is necessary to have a battery of sufficient capacity to supply all of the closing coils without the battery voltage dropping below the operating value of the closing coils. For large installations, the size and cost of such a battery are so great that it is not economical to use such an arrangement. By providing an arrangement, however, whereby the number of closing coils that can be connected to the battery at any instant is limited to a certain number, a battery having a capacity only sufficient to take care of the limited number of closing coils that can be connected thereto at any instant, may be used, thereby reducing the cost of such an installation materially.

The system shown in Fig. 1 is arranged so that only one closing coil 4 can be connected to the battery 5 at any instant. Each closing coil is controlled by a relay 6 which, in turn, is controlled by two control relays 9 and 10 associated therewith. When both of the control relays 9 and 10 associated with any one of the relays 6 are energized, the associated relay 6 is energized and completes the circuit of the closing coil 4 associated therewith. The circuit of each closing coil, when completed, also includes the coil of a relay 11, the contacts 12 of which are in the circuits of all of the control relays 10. The relay 11 is arranged to open its contacts 12 whenever the battery supplies current to any one of the closing coils 4 so that all of the control relays 10 are deenergized when the relay 11 is energized. In order to insure that the closing coils 4 remain energized for a sufficient length of time to close the circuit breakers associated therewith after the control relays 9 and 10 associated therewith are deenergized, the control relays 6 are preferably of the well-known hesitating type which are designed so as to maintain their contacts closed for a certain length of time after the coils thereof are deenergized.

Each control relay 9 is connected so that it is energized after the circuit breaker, with which it is associated, has been open for a certain length of time. This result is accomplished by means of a time relay 14 associated with each circuit breaker, and energized when the associated circuit breaker is open. Each time relay 14, when energized, closes its contacts 15 after a predetermined time and completes the circuit of the associated control relay 9. Each relay 9, when energized, completes a circuit for its associated control relay 10 if no other control relay 10 is energized. This result is accomplished by having the energizing circuit of each control relay 10 include the contacts 16 of all of the other control relays 10. The contacts 16 are closed only when the respective control relays 10 are deenergized.

In order to prevent the simultaneous energization of two or more relays 10 when two or more control relays 9 are energized simultaneously, the circuits of the relays 10 are arranged so that the relays operate in a predetermined sequence under such conditions. This is accomplished by having each control relay 9, when energized, open the circuits of all of the control relays 10 which follow its associated control relay 10 in said sequence. As shown in the drawing, the sequence in which the relays 10 operate under the above-mentioned conditions is the same as the order in which they appear from left to right in the drawing, namely, the control relay 10 associated with the energized control relay 9 nearest the left edge of the drawing is the first one to be energized, then the control relay 10 associated with the next energized control relay 9 nearest the left edge of the drawing is the second one to be energized; and so on until the control relays 10 associated with all of the energized control relays 9 have been energized. This result is obtained by having the circuit of each control relay 10 shown in the drawing include the contacts 17 of the control relays 9 nearer the left edge of the drawing, which are closed only when the respective control relays 9 are deenergized. Therefore, it is evident that if two or more control relays 9 are energized simultaneously, the one nearest the left edge of the drawing opens the energizing circuits of the control relays 10 associated with all of the other control relays 9 to the right thereof, so that only the control relay 10 associated with the energized control relay 9 nearest the left edge of the drawing is energized to effect the closing of a circuit breaker. After the circuit breaker controlled by the two energized control relays 9 and 10 nearest the left edge of the drawing has closed, the control relay 10 associated with the next energized control relay 9 nearest the left edge of the drawing is energized and effects the closing of its circuit breaker. This operation continues in the predetermined sequence until all of the circuit breakers are closed.

In order to prevent the coil of each control relay 10 from being deenergized by the opening of its own contacts 16, which are connected in the energizing circuit of the relay, each relay is provided with the contacts 18 which are closed when the relay is energized and which complete a locking circuit for the coil of the relay. The locking circuit is independent of the contacts 16 of the relay and the contacts 17 of any of the control relays 9. Preferably the relays 10 are designed so that they close their contacts 18 before they open their contacts 16. Therefore, after the energizing circuit of a control relay 10 has been completed, the relay remains energized until the circuit of the closing coil 4 of the associated circuit breaker 1 is completed, at which time the relay 11 opens the locking circuit of the coil of the energized relay 10. As soon as the circuit of the energized closing coil 4 is opened, the relay 11 again closes its contacts 12, thereby completing the circuit of the next relay 10 in said predetermined sequence whose associated control relay 9 is energized.

By means of the relay 11 in the battery circuit, a very simple arrangement is obtained for securing the proper sequence of operation when two or more circuit breakers are open and are in a condition to be reclosed. As pointed out heretofore, whenever both of the control relays 9 and 10 associated with any one of the circuit breakers are energized, the circuit of the hesitating control relay 6 of the circuit breaker is completed to connect the closing coil 4 thereof across the battery 5. When the circuit breaker closes the control relays 6, 9 and 10 associated therewith are deenergized. The relays 9 and 10 immediately return to their deenergized positions but the hesitating control relay 6 maintains its contacts closed for a short time after it is deenergized in order to insure the complete closing of the circuit breaker. Therefore, if no other means were provided, the closing of the contacts 16 of the control relay 10 and the contacts 17 of the control relay 9 would complete the circuit of next control relay 10 in said predetermined sequence whereby the closing coil of another circuit breaker would be connected across the battery before the hesitating control relay 6 of the circuit breaker, which was closed first, opens its contacts. Under these conditions, two closing coils would be connected to the source at the same instant. This undesirable operation, however, is prevented by the relay 11 in the battery circuit which, by opening contacts in the circuits of all of relays 10 whenever the battery is supplying current to any one of the closing coils, prevents the circuit of another control relay 10 from being completed so long as the battery remains connected to the closing coil.

It will be evident that when any one of the relays 10 is energized, the energization of any one of the control relays 9 associated with one of the control relays 10 which precedes the energized control relay 10 in said predetermined sequence, does not effect the energization of the control relay 10 associated therewith because the energizing circuit of the coil of the relay 10 is open at the contacts 16 of the energized relay 10.

In order to limit the number of times that a circuit breaker can be opened and closed when an overload or short circuit is connected to the circuit controlled thereby, each circuit breaker has associated therewith a notching relay 25 which is provided with the contacts 26 in the circuit of the time relay associated with the circuit breaker, the contacts 26 being arranged to be opened after the coil 27 of the notching relay has been energized successfully a predetermined number of times. Each notching relay has its operating coil 27 connected in parallel with the coil 28 of the time relay 14 associated therewith so that it is energized every time the circuit breaker opens. As shown, each notching relay 25 is of the well-known type which opens its contacts 26 after its coil 27 has been energized a predetermined number of times with less than a predetermined time interval between successive energizations of the coil 27. Preferably the contacts 26, after being opened, have to be reset manually.

The operation of the embodiment of my invention shown in Fig. 1 as as follows:

When all of the circuit breakers are closed and the load conditions are normal, the control devices are in the positions shown. Each circuit breaker is held in its closed position by the latch associated therewith. In case of an overload or short circuit on any one of the circuits, the trip coil 2 of the circuit breaker in the overloaded circuit is energized sufficiently to trip the latch so that the circuit breaker opens. When the circuit breaker opens, its auxiliary contacts 30 complete the circuit of the coils 27 and 28 of the associated notching relay 25 and time relay 14. This circuit is from the ungrounded terminal of the battery 5, through the contacts 30 of the open circuit breaker 1, coils 27 and 28 of the relay 25 and 14 respectively associated with the open breaker, contacts 26 of the notching relay 25, to the grounded terminal of the battery 5. After a predetermined time, the energized time relay 14 closes its contacts 15 and completes the circuit of the coil 13 of the control relay 9 associated with the open circuit breaker. This circuit is from the ungrounded terminal of the battery 5 through the auxiliary contacts 30 on the circuit breaker 1, contacts 15 of the time relay 14, coil 13 of the control relay 9, to the grounded terminal of the battery 5. The control relay 9, by opening its contacts 17, opens the circuits of the coils of all of the control relays 10 except those that are connected to battery at points nearer the battery than the contacts 17 that are opened. As shown in the drawing, the opening of the contacts 17 of any one of the relays 9 opens the energizing circuits of the coils of all control relays 10 shown to the right of the energized control relay 9 so that these coils are not energized by the subsequent energization of their respective control relays 9.

By closing its contacts 31, the energized control relay 9 connects the coil 32 of the control relay 10 associated therewith across the battery 5 if all of the other control relays 10 are in their normal positions and the contacts 12 of the relay 11 are closed. This circuit is from the ungrounded terminal of the battery 5, through the contacts 12 of the relay 11, contacts 16 of all of the control relays 10, contacts 17 of all of the control relays 9 to the left of the energized control relay 9, coil 32 of the control relay 10 associated with the energized control relay 9 nearest the left edge of the drawing, contacts 31 of the energized control relay 9 to the grounded terminal of the battery 5.

By closing its contacts 18, the energized control relay 10 completes a locking circuit for itself which is independent of its contacts 16 and the contacts 17 of all of the relays 10, and by opening its contacts 16 prevents the energizing circuits of all of the other coils 32 from being completed.

The energized control relay 10 by closing its contacts 33 completes the circuit of the coil 34 of the hesitating control relay 6 associated therewith. This circuit is from the ungrounded terminal of the battery 5 through the auxiliary contacts 30 on the open circuit breaker contacts 33 of the energized control relay 10, coil 34 of the hesitating control relay 6 to the grounded terminal of the battery 5. The energization of the coil 34 of the hesitating control relay connects the closing coil 4 of the open circuit breaker across the battery. The circuit is from the ungrounded terminal of the battery 5 through the coil of the relay 11, closing coil 4 of the circuit breaker, contacts 35 of the hesitating control relay 6 to the grounded terminal of the battery.

As soon as the closing coil circuit is closed, sufficient current flows through the relay 11 to cause it to open its contacts 12, thereby opening the circuit of the energized coil 32 of the control relay 10 associated with the circuit breaker that is being closed.

The opening of the auxiliary contacts 30 on the circuit breaker when the circuit breaker is closed, opens the circuits of the coil 28 of the time relay 14, the coil 27 of the notching relay 25, and the coil 34 of the hesitating control relay associated therewith. Relays 14 and 25 return to their deenergized position immediately but the hesitating control relay 6 does not open its contacts 35 until a predetermined time after its coil 34 is deenergized. Therefore, the relay 11 remains energized after the control relay 10 of the circuit breaker, which has just closed, closes its contacts 16. Consequently, the closing of these contacts 16 does not complete the circuit of the coil 32 of the control relay 10 associated with the next energized control relay in said predetermined sequence, because the circuit of this coil 32 is opened at the contacts 12 of the relay 11. As mentioned heretofore, the object in delaying the opening of the contacts 35 of the hesitating control relay 6 is to allow the closing coil 4 to be energized for a sufficient length of time to insure the proper closing of the circuit breaker. As soon as the hesitating relay 6 opens its contacts 35, the relay 11 closes its contacts 12 and completes the circuit of the coil 32 of the next control relay 10 in said predetermined sequence provided its associated control relay 9 is energized.

It will be evident that by means of the relay 11 in the battery circuit, which is energized so long as any one of the hesitating control relays is in its energized position, it is impossible for a second closing coil circuit to be completed until the first closing coil circuit is opened by the hesitating control relay 6 associated therewith opening its contacts 35 after the first closing coil circuit has been closed for a sufficient length of time to close the breaker.

If the short circuit or overload is connected to the circuit when the circuit breaker therein closes, the circuit breaker opens immediately and the above operation of the reclosing equipment is repeated. Each time the breaker opens the notching relay 25 associated therewith notches one notch. If the overload or short circuit remains connected for a sufficient length of time so that the circuit breaker in the circuit is opened a predetermined number of times with less than a predetermined time between each successive closing and opening, the notching relay 25 opens its contacts 26 so that the time relay 14 is not energized when the associated circuit breaker is open. Since the contacts 26 are arranged so that they have to be reset manually, the reclosing equipment is rendered inoperative until the contacts 26 are closed manually.

If a circuit breaker 1 remains closed for a certain length of time after being reclosed, the notching relay automatically resets itself to its normal position in a manner well known in the art.

In the modification of Fig. 1 shown in Fig. 2, the control relays 9 and 10 associated with each circuit breaker 1 in Fig. 1 are replaced by a single relay 40. The notching relays 25 have been omitted in order to simplify the drawing.

The circuit of the coil 41 of each relay 40 in Fig. 2 includes the contacts 15 of the time relay 14 associated with the circuit breaker controlled by the relay 40 and the contacts 42 of all of the other relays 40 between the particular relay 40 in question and the right edge of the drawing. The circuit of each coil 41 also includes the contacts 43 of all of the other relays 40 between the particular relay 40 in question and the left edge of the drawing. Therefore, since the contacts 42 and 43 of each relay 40 are closed only when the respective relay is deenergized, each relay 40 can be energized only when all of the other relays are deenergized.

Each relay 40 is also provided with the contacts 45 which are connected in the circuit of the hesitating control relay 6 of the circuit breaker controller thereby.

Instead of using a relay 11 in the battery circuit to prevent a second closing coil being connected to the battery when one is connected thereto, the same result is accomplished in the modification shown in Fig. 2 by having the circuit of each coil 41 include the contacts 48 of all of the hesitating control relays 6. The contacts 48 are closed only when the respective relays 6 are in their deenergized positions. Therefore, so long as any one of the hesitating control relays 6 is in its energized position, thereby connecting its associated closing coil 4 across the battery, it is impossible for another control relay 14 to be energized although the control relay 14, associated with the circuit breaker whose closing coil is energized, has returned to its deenergized position.

It is believed that the operation of the modification shown in Fig. 2 is obvious from the description given heretofore of the operation of the arrangement shown in Fig. 1 so that only a brief description of the operation of the modification shown in Fig. 2 is deemed necessary. The opening of any one of the circuit breakers completes, by closing its contacts 30, the circuit of the time relay 14 associated therewith. The time relay 14 in turn completes the circuit of the coil 41 of the control relay 40 associated with the open circuit breaker if all of the other control relays 40 and all of the hesitating control relays 6 are deenergized, since the circuit of each coil 41 includes the contacts 43 of all of the relays 40 to the left thereof and the contacts 42 of all of the relays 40 to the right thereof, and the contacts 48 of all of the hesitating control relays 6. By opening its contacts 42 and 43 when it is energized each relay 40 prevents any other relay 40 from being energized so long as it is energized. By the closing of its contacts 45, each relay 40 completes the circuit of the hesitating control relay 6 of the circuit breaker associated with the control relay 40 which is energized. The hesitating relay 6 in turn connects the closing coil of the circuit breaker across the battery 5. By opening its contacts 48 when it is energized, each relay 6 opens the circuits of all of the control relays 40 so that another control relay 40 cannot be energized until the closing circuit breaker, which is being closed, has been opened after a predetermined time by the hesitating control relay 6. Since the contacts 30 on the circuit breaker are opened as soon as the circuit breaker closes, the relay 14 associated therewith is deenergized and returns to its normal position before the relay 6 closes its contacts 48. When these contacts 48 are closed after the circuit breaker closes, the circuit of the next control relay 40 is completed provided its time relay 14 has already closed its contacts 15.

While I have, in accordance with the patent statutes, shown and described my invention as applied to a particular system, and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, a plurality of electroresponsive devices, a source of current, a control relay associated with each electroresponsive device and arranged when energized to effect the connection of the associated electroresponsive device to said source of current, a circuit for each relay arranged to be completed when all of the other relays are deenergized and the associated electroresponsive device is in a predetermined position, contacts in said circuits, and means operative in response to the current supplied by said source to any one of said plurality of electroresponsive devices for effecting the opening of said contacts in all of said circuits whereby all of said relays are denergized when an electroresponsive device is being supplied by said source.

2. In combination, a plurality of circuit breakers, electroresponsive means for closing each circuit breaker, a source of current, control means associated with each circuit breaker and operative when the respective circuit breaker is open to connect the electroresponsive means of the respective circuit breaker to said source of current, and means responsive to the output of said source for preventing the operation of any one of said control means while said source is supplying current to any one of said electroresponsive means.

3. In combination, a plurality of circuit breakers, a closing coil for each circuit breaker, a source of current, a separate relay associated with each circuit breaker and controlling a connection between the closing coil thereof and said source of current, a circuit for each relay, contacts in each relay circuit controlled by other relays whereby only one of said relays can be energized at a time, means responsive to the output supplied by said source to said closing coil and contacts in each relay circuit controlled by said last-mentioned means whereby the circuits of all of said relays are opened when said source is supplying current to a predetermined number of closing coils.

4. In combination, a plurality of circuit breakers, a closing coil for each circuit breakers, a source of current, a circuit for each closing coil, including said source, contacts in each closing coil circuit, a relay associated with each circuit breaker and arranged when energized to effect the closing of the contacts in the closing coil circuit of the circuit breaker associated therewith, a circuit for each relay, contacts in the circuit of each relay arranged to be controlled by the position of the circuit breaker associated therewith, other contacts in the circuit of each relay arranged to be controlled by the other relays whereby only one relay can be energized at a time, means responsive to the current supplied by said source to said closing coils, and contacts in the circuit of each relay controlled by said current responsive means whereby none of said relays can be energized while said source is supplying current to any one of said closing coils.

5. In combination, a plurality of circuit breakers, a closing coil for each circuit breaker, a source of current, a circuit for each closing coil, including said source, contacts in the circuit of each closing coil, a hesitating control relay associated with each closing coil circuit in controlling the contacts in the associated closing coil circuit, a circuit for each hesitating control relay, a control relay associated with each hesitating control relay and arranged to control the circuit thereof, a circuit for each control relay, contacts in the circuit of each control relay controlled by the other control relays whereby only one of said control relays can be energized at a time, other contacts in the circuit of each control relay controlled by the position of the associated circuit breaker, means responsive to the current supplied by said source to said closing coils, and other contacts in the circuit of each control relay controlled by said current responsive means.

6. In combination, a plurality of electroresponsive devices, a source of current, a circuit for each electroresponsive device, contacts in each of said circuits, a control relay associated with each electroresponsive device and arranged when energized to effect a closing of the contacts in the circuit of the electroresponsive devices associated therewith, a circuit for each control relay, electroresponsive control means associated with each control relay and arranged to control the circuit thereof, said electroresponsive means being arranged whereby only one of said electroresponsive control means can be energized at any instant to complete the control relay circuit, and circuits for said electroresponsive control means controlled by said control relays whereby any one of said electroresponsive control means can be energized only when all of said control relays are in their deenergized positions.

7. In combination, a plurality of circuit breakers, a closing coil for each circuit breaker, a source of current, a circuit for each closing coil including said source, contacts in each closing coil circuit, a control relay associated with each circuit breaker and arranged when energized to effect the closing of the contacts in the closing coil circuit of the circuit breaker associated therewith, a circuit for each control relay, electroresponsive means associated with each circuit breaker for controlling said control relay circuits whereby only one control relay can be energized at a time, and circuits for said electroresponsive means arranged to be completed only when all of said control relays are in their deenergized positions.

In witness whereof, I have hereunto set my hand this 30th day of July, 1924.

ARVID E. ANDERSON.